US007161561B2

(12) United States Patent
Kitayama

(10) Patent No.: US 7,161,561 B2
(45) Date of Patent: Jan. 9, 2007

(54) DISPLAY SYSTEM

(75) Inventor: Kenzo Kitayama, Kobe (JP)

(73) Assignee: Furuno Electric Company Limited, Hyogo-ken (JP)

( * ) Notice: Subject to any disclaimer, the term of this patent is extended or adjusted under 35 U.S.C. 154(b) by 407 days.

(21) Appl. No.: 10/625,078

(22) Filed: Jul. 22, 2003

(65) Prior Publication Data
US 2004/0051681 A1 Mar. 18, 2004

Related U.S. Application Data

(63) Continuation of application No. 09/247,815, filed on Feb. 9, 1999, now Pat. No. 6,628,299.

(30) Foreign Application Priority Data
Feb. 10, 1998 (JP) ................................... 10-28756

(51) Int. Cl.
*G09G 5/00* (2006.01)
(52) U.S. Cl. .......................................... 345/9; 345/2.1
(58) Field of Classification Search ................ 345/1.1, 345/2.1, 2.2, 2.3, 9, 440, 440.1, 634; 367/107, 367/110, 111, 113; 342/176, 177; 348/586, 348/588
See application file for complete search history.

(56) References Cited

U.S. PATENT DOCUMENTS

| 4,590,569 | A | * | 5/1986 | Rogoff et al. | 701/219 |
| 5,179,385 | A | * | 1/1993 | O'Loughlin et al. | 342/176 |
| 5,751,344 | A | * | 5/1998 | Schnee | 348/113 |
| 6,628,299 | B1 | * | 9/2003 | Kitayama | 345/635 |

FOREIGN PATENT DOCUMENTS

WO   WO/97/04334   *  6/1997

* cited by examiner

Primary Examiner—Ricardo Osorio
(74) Attorney, Agent, or Firm—Jordan and Hamburg LLP

(57) ABSTRACT

In a display system capable of displaying images fed from a plurality of sensing devices on an indicator, horizontal and vertical synchronizing signals of the individual measuring devices are synchronized with one another and desired image signals are selected for on-screen presentation during each successive horizontal scanning period, whereby operator-selected multiple images are displayed.

15 Claims, 15 Drawing Sheets

| DISPLAY MODE | IMAGE SELECT SIGNALS | | | IMAGE PRIORITY SIGNALS | | ON-SCREEN DISPLAY |
|---|---|---|---|---|---|---|
| | S1 | S2 | S3 | P1 | P2 | |
| ① RADAR PICTURE ONLY | ⊓⌐ | HI | HI | LO | LO | ○ |
| ② PLOTTER PICTURE ONLY | HI | ⊓⌐ | HI | LO | LO | ○ |
| ③ ECHO SOUNDER PICTURE ONLY | HI | HI | ⊓⌐ | LO | LO | ▢ |
| ④ RADAR + PLOTTER (PRIORITY ON RADAR) | ⊓⌐ | ⊓⌐ | HI | HI | LO | ○ |
| ⑤ RADAR + PLOTTER (PRIORITY ON PLOTTER) | ⊓⌐ | ⊓⌐ | HI | LO | HI | ○ |
| ⑥ RADAR + ECHO SOUNDER | ⊓⌐ | HI | ⊓⌐ | LO | LO | ▭ ○ |
| ⑦ PLOTTER + ECHO SOUNDER | HI | ⊓⌐ | ⊓⌐ | LO | LO | ▭ ○ |

FIG.8

DISPLAY SYSTEM

BACKGROUND OF THE INVENTION

The present invention relates generally to an image display system for displaying image information from measuring equipment, such as an echo sounder, and more particularly, the invention is concerned with a display system which can display more than one kind of image information received from a plurality of measuring devices in an integrated manner.

Today's modern fishing vessels and pleasure craft are equipped with a radar 1, a course plotter 2 incorporating, or connected to, a Global Positioning System (GPS) receiver, an echo sounder 3, and so on, as shown in FIG. 1. In a conventional onboard system of this kind, a dedicated indicator M1 is connected to the radar 1 by three signal lines for red (R), green (G) and blue (B) signals, signal lines for horizontal (H) and vertical (V) synchronizing signals. Similarly, an indicator M2 is connected to the course plotter 2 by its R, G and B signal lines and two synchronizing signal lines, while an indicator M3 is connected to the echo sounder 3 by its R, G and B signal lines and two synchronizing signal lines.

Since the aforementioned indicators M1–M3 are usually provided in a ship's bridge, the same number of additional indicators and signal lines become necessary if it is desired to monitor the same pictures as shown on the indicators M1–M3 in a remote location, such as a cabin, for example. The conventional onboard system has therefore been associated with the following problems:

A number of expensive indicators are required.

It is difficult to provide space for installing such multiple indicators.

Since three different pictures are individually shown on separate display screens, it is difficult for a viewer to give his or her consistent attention to the individual pictures, and this would result in a likelihood that the viewer could overlook important information.

SUMMARY OF THE INVENTION

This invention is intended to solve the aforementioned problems of prior art technology. Accordingly, it is an object of the invention to provide a display system which makes it possible to selectively present one or more images on an indicator by choosing them from multiple image signals or to set a desired measuring range and other operational parameters by making such choice or settings on the relevant indicator.

In one aspect of the invention, a display system can present a single image or multiple images on an indicator using image signals fed from a plurality of measuring devices.

To present multiple images on the single indicator, it is essential that image signals from the individual measuring devices be delivered with precisely controlled timing. For this purpose, the display system comprises a synchronizer for synchronizing horizontal and vertical synchronizing signals of the individual measuring devices with one another.

The display system also comprises an image selector for selectively switching to desired image signals during each successive horizontal scanning period or vertical scanning period to make it possible to present two different images, which are arranged horizontally or vertically, for instance, on the indicator screen.

Horizontally or vertically arranged multiple images can be displayed on the indicator by using the image signals, whichever selected by the image selector, based on the horizontal and vertical synchronizing signals.

The images to be displayed can be selected from the indicator if there is provided means for transmitting an image selection command from the indicator to the image selector.

When two image signals A, B are selected for the same display area of the indicator screen, two different images are superimposed in that display area. If, however, one of the image signals (image signal A, for example) has a dominantly high signal level, the other image signal B would be completely buried. To prevent this from happening, the display system in one varied form further comprises an image priority allocator which gives first priority to one of the two image signals in selecting a foreground image in image overlay mode. The display system of this variation makes it possible to clearly present a desired image in the foreground.

In another varied form of the display system, control signals for setting measuring ranges and other operational parameters of the multiple measuring devices are transmitted from the indicator to the measuring devices through a control line. This makes it possible to remotely control the individual measuring devices from the indicator.

In still another varied form of the display system, a plurality of indicators are parallel-connected and image selection commands and measuring range setting commands can be transmitted from any of the indicators through a common control line. The display system of this variation makes it possible to select desired images and set measuring ranges and other operational parameters of the individual measuring devices from any indicator.

In another aspect of the invention, a display system can present images on a plurality of indicators in different display modes using image signals fed from a plurality of measuring devices.

To make it possible to present different images on the multiple indicators, the display system comprises dedicated image selectors provided to the individual indicators. If the image signals are supplied directly from the multiple measuring devices to the individual indicators, more than one signal line would be required. To avoid this inconvenience, the display system of the invention comprises an RGB signal mixer which combines R, G and B image signals output from each of the measuring devices into a single video signal, and each of the image selectors includes means for separating the combined video signal of each measuring device into its original R, G and B image signals.

These and other objects, features and advantages of the invention will become more apparent upon reading the following detailed description in conjunction with the accompanying drawings.

BRIEF DESCRIPTION OF THE DRAWINGS

FIG. 8 is a diagram showing various display modes provided by the present display system;

PREFERRED EMBODIMENTS

Figure 1:
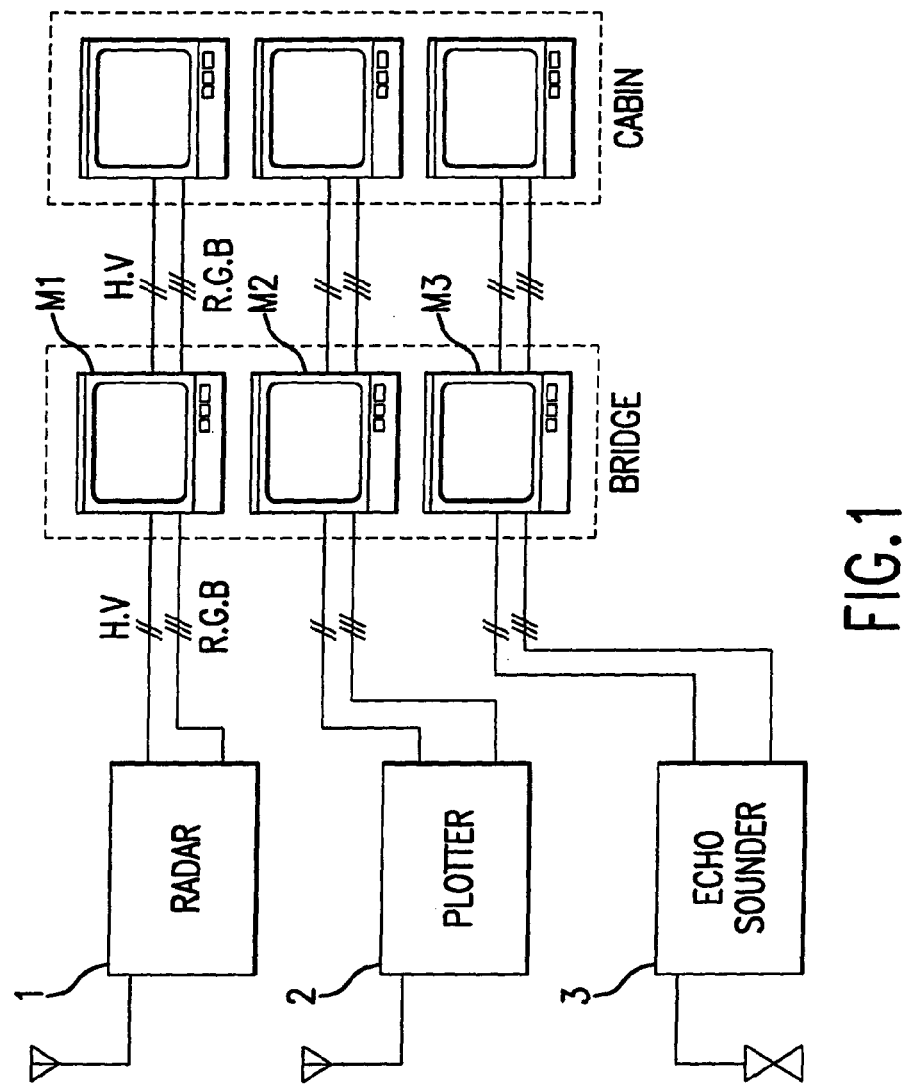
FIG. 1 is a general system diagram of a conventional onboard system comprising a plurality of measuring devices.
Figure 2:
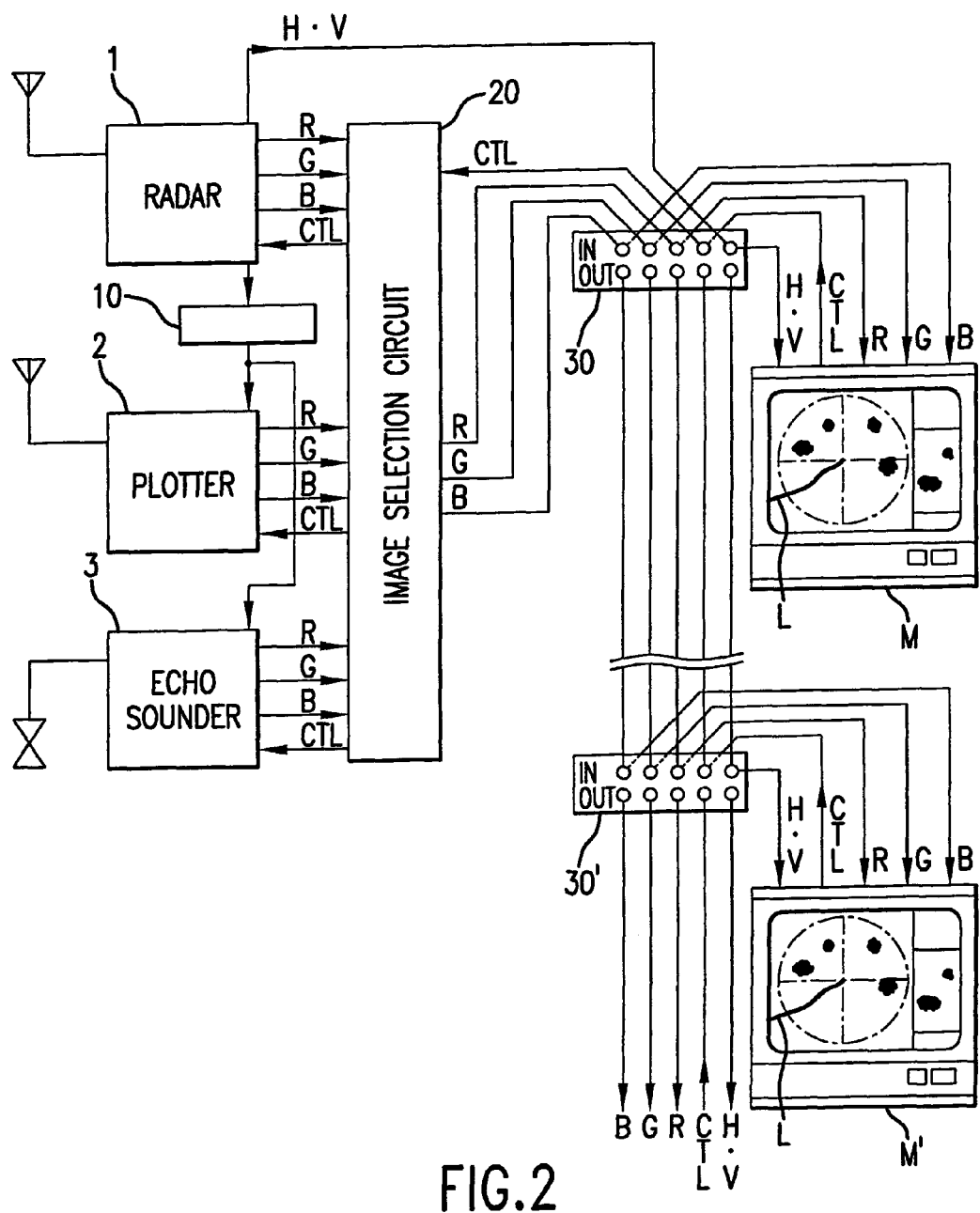
FIG. 2 is a general block diagram of a display system according to a first embodiment of the invention.

FIG. 2 is a general block diagram of a display system installed onboard a ship according to a first embodiment of the invention, in which elements equivalent to those shown in FIG. 1 are designated by the same reference numerals or letters.

Designated by the numeral 10 in FIG. 2 is a synchronizing circuit which synchronizes the operational timing of a course plotter 2 and an echo sounder 3 with an internal synchronizing signal of a radar 1. The course plotter 2 incorporates, or is connected to, a GPS receiver. Designated by the numeral 20 is an image selection circuit which selects one or more desired image signals from those fed from the individual measuring devices 1–3 and combines the selected image signals. Indicated by 30 and 30' are interconnecting terminal strips, each having a plurality of input terminals IN which are directly connected to their corresponding output terminals OUT. Indicated by M and M' are indicators which individually receive R, G and B image signals as well as a horizontal synchronizing signal H and a vertical synchronizing signal V from the respective interconnecting terminal strips 30, 30'. The two indicators M, M' are connected to a common control line CTL which is connected to the individual measuring devices 1–3 by way of the image selection circuit 20 and carries signals for switching on-screen images and varying measuring ranges and other operational parameters of the individual measuring devices 1–3.

In FIG. 2, the indicators M, M' show examples of split-screen presentation, each including an echogram produced by the echo sounder 3 and shown on right-hand one-third of the full-screen area and a radar picture produced by the radar 1 and shown on left-hand two-thirds of the full-screen area. Furthermore, the ship's plotted course L is overlaid on the radar picture.

Figure 3:
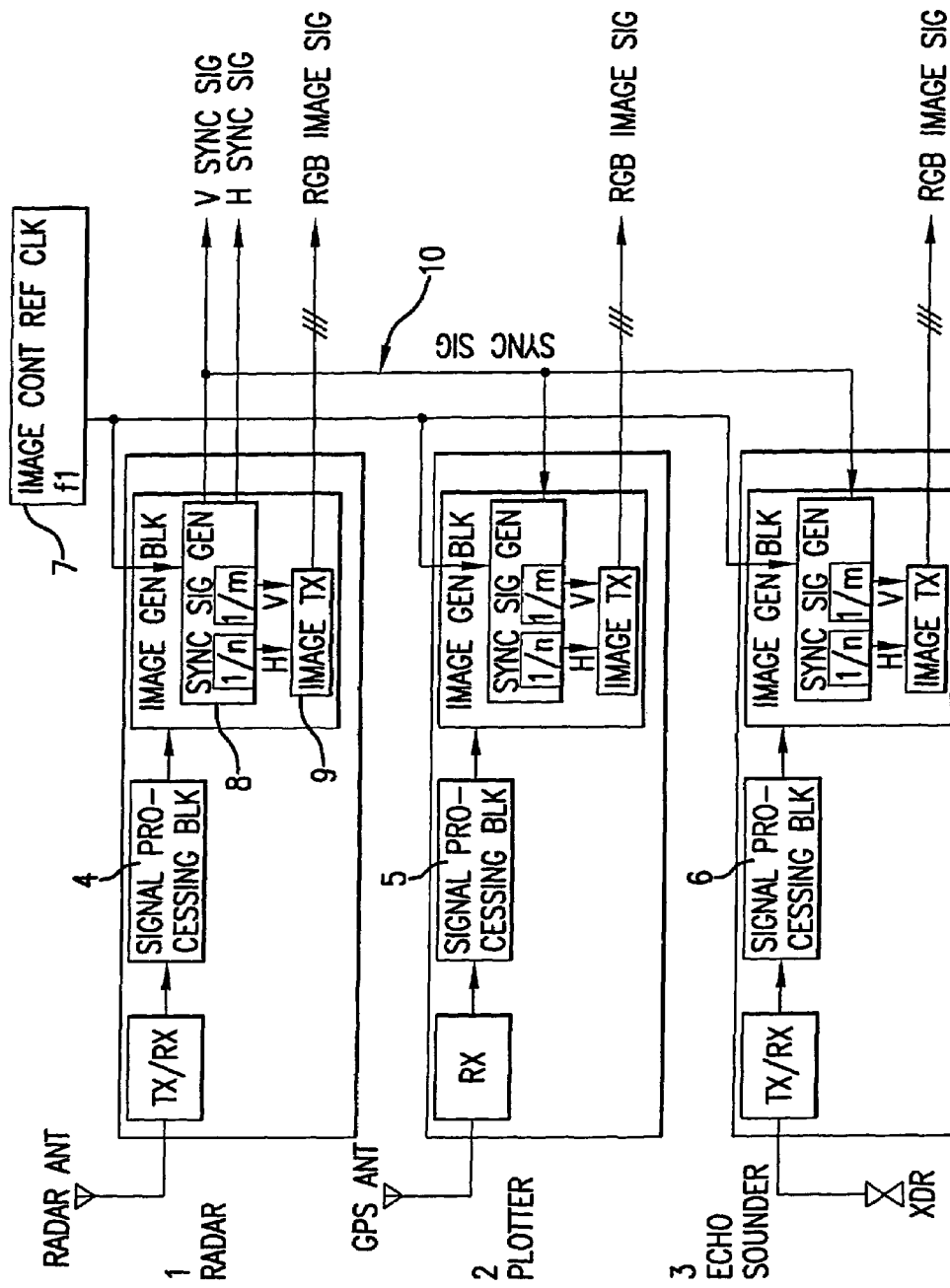
FIG. 3 is a detailed block diagram showing the internal configuration of individual measuring devices and a synchronizing circuit.

FIG. 3 is a detailed block diagram showing the internal configuration of the individual measuring devices 1–3 and the synchronizing circuit 10. In the radar 1, a signal processed by a signal processing block 4 is delivered to an image generating block. The image generating block includes a synchronizing signal generator 8 which receives a reference clock f1 from a reference clock generator 7 and produces the horizontal synchronizing signal H and the vertical synchronizing signal V by means of a 1/n divider and a 1/m divider, respectively. The radar 1 also comprises an image transmitter 9 which generates and transmits R, G and B analog image signals according to the synchronizing signals H, V.

The course plotter 2 and the echo sounder 3 comprise respective signal processing blocks 5, 6. Signals processed by the signal processing blocks 5, 6 are delivered to respective image generating blocks. These image generating blocks take in the vertical synchronizing signal V from the radar 1 as a reset signal and individually produce horizontal and vertical synchronizing signals which are synchronized with the signals generated in the radar 1. Then, the course plotter 2 and the echo sounder 3 generate image signals according to their synchronizing signals. The earlier-mentioned synchronizing circuit 10 is a circuit for feeding the vertical synchronizing signal V from the radar 1 to the course plotter 2 and the echo sounder 3.

Figure 4:
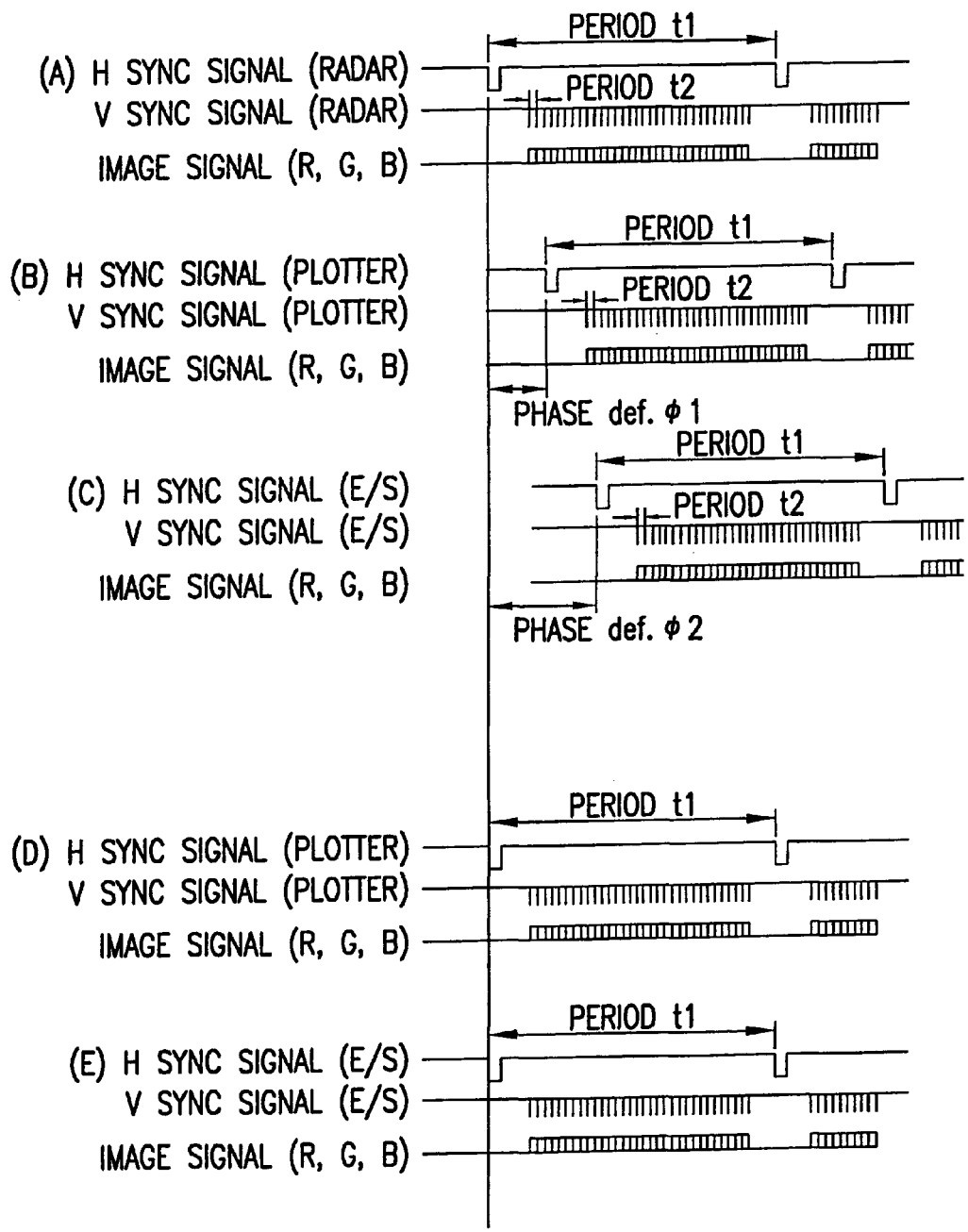
FIGS. 4A to 4E are time charts showing the operation of the synchronizing circuit of FIG. 2.

FIG. 4A shows the vertical synchronizing signal V (period t1), the horizontal synchronizing signal H (period t2) and RGB image signals of the radar 1. As depicted in FIG. 4B, the signals originally produced in the course plotter 2 have a phase delay of $\phi1$ with respect to the corresponding signals of the radar 1. Likewise, the signals originally produced in the echo sounder 3 have a phase delay of $\phi2$ with respect to the corresponding signals of the radar 1 as shown in FIG. 4C. When the vertical synchronizing signal V output from the radar 1 is supplied to the image generating blocks of the course plotter 2 and the echo sounder 3 as shown in FIG. 3, the signals of the course plotter 2 and the echo sounder 3 are synchronized with the signals of the radar 1 as shown in FIGS. 4D and 4E.

Figure 5:
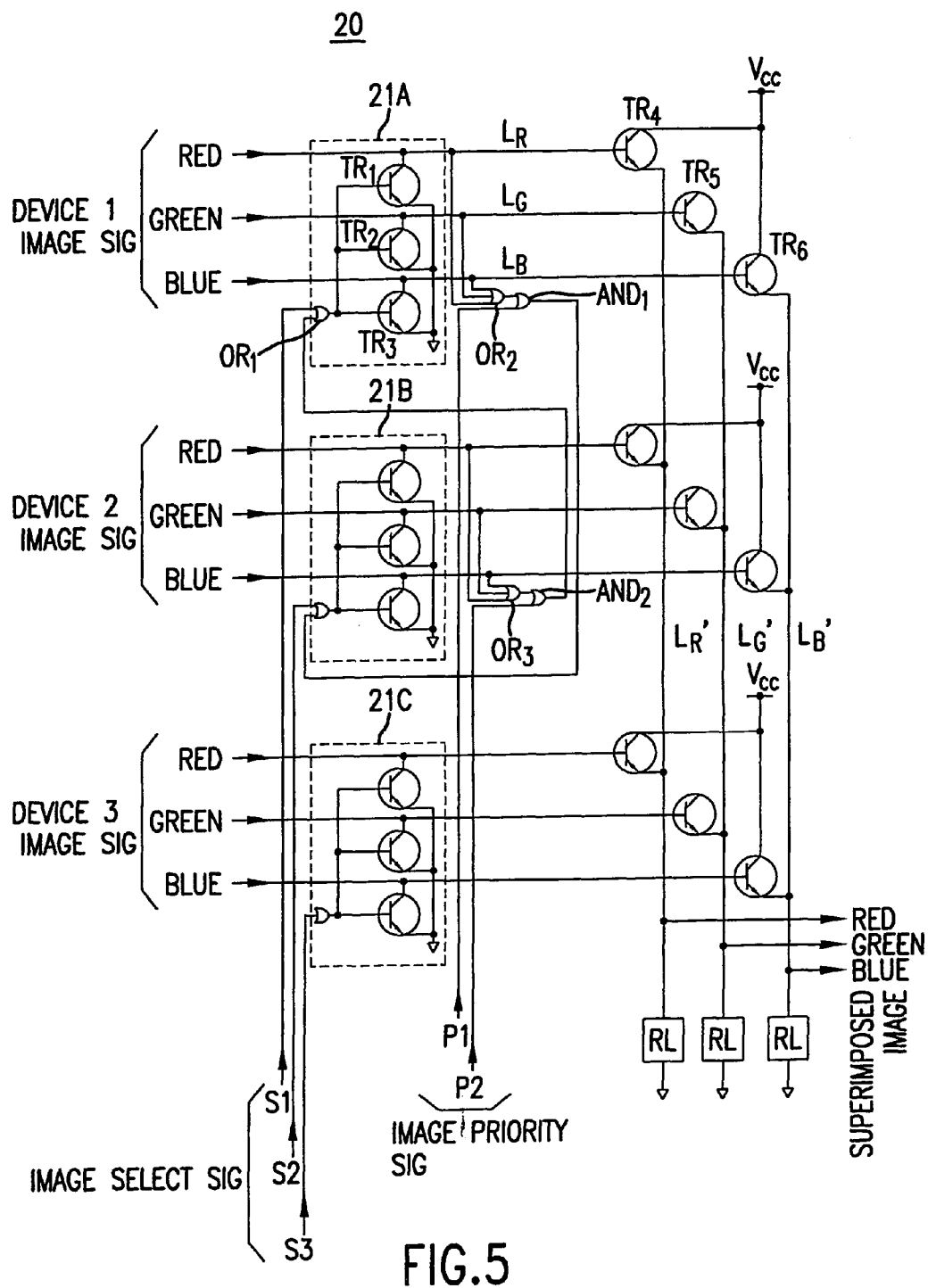
FIG. 5 is a detailed circuit diagram showing the configuration of an image selection circuit of FIG. 2.

FIG. 5 is a detailed circuit diagram showing the configuration of the image selection circuit 20, in which the radar 1, the course plotter 2 and the echo sounder 3 are designated as "devices 1, 2 and 3", respectively, and designated by 21A, 21B and 21C are image selection sub-circuits. Since these circuits have a common circuit configuration, their constituent elements are identified by the same alphanumeric designations. R, G and B signal lines of the individual measuring devices are connected to transistors TR1, TR2 and TR3, respectively, whose emitters are grounded and bases are connected to output terminals of respective OR gates OR1.

Signal lines $L_R$, $L_G$ and $L_B$ from the image selection sub-circuits 21A and 21B are connected to input terminals of OR gates OR2 and OR3 and outputs of the OR gates OR2 and OR3 are connected to input terminals of AND gates AND1 and AND2, respectively. Signal lines for entering image priority signals P1 and P2 are connected to other input terminals of the AND gates AND1 and AND2, respectively. An output terminal of the AND gate AND1 is connected to an input terminal of the OR gate OR1 of the image selection sub-circuit 21B while an output terminal of the AND gate AND2 is connected to an input terminal of the OR gate OR1 of the image selection sub-circuit 21A. Further, signal lines for entering image select signals S1, S2 and S3 are connected to other input terminals of the OR gates OR1, OR2 and OR3, respectively.

Besides the aforementioned signal lines $L_R$, $L_G$ and $L_B$, there are provided lines $L_R'$, $L_G'$ and $L_B'$ which are grounded through respective load resistors RL. The signal lines $L_R$, $L_G$ and $L_B$ from the device 1 are connected to bases of transistors TR4, TR5 and TR6, whose collectors are connected to a supply voltage Vcc and emitters are connected to the lines $L_R'$, $L_G'$ and $L_B'$.

Figure 6:
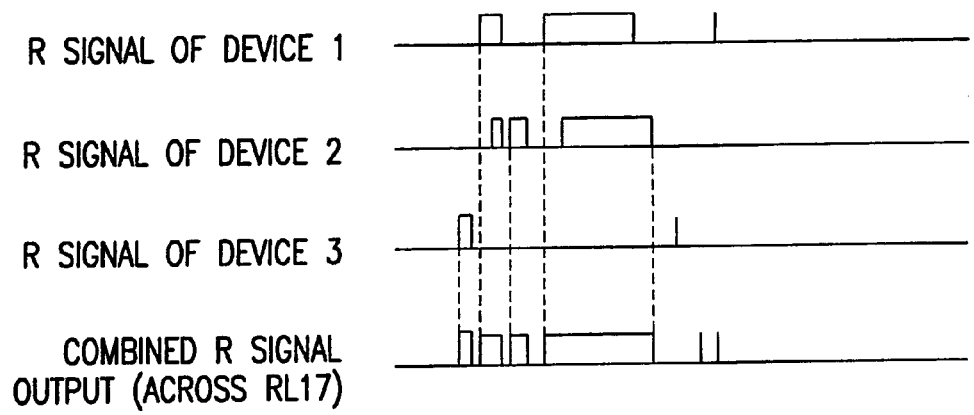
FIG. 6 is a diagram depicting how image signals of the individual measuring devices are combined with one another in the circuit of FIG. 5.

The devices 2 and 3 are also connected to respective transistors TR4, TR5 and TR6 of a similar configuration. Each combination of the transistors TR4, TR5 and TR6 constitutes a buffer circuit. Since the transistors TR4, TR5 and TR6 connected to the devices 1–3 are connected to the respective common load resistors RL for the R, G and B lines, R signals of the individual devices 1–3 are added together, or superimposed, by the transistors TR4 as shown in FIG. 6.

The image select signals S1, S2, S3 and image priority signals P1, P2 correspond to display control signals transmitted through the common control line CTL shown in FIG. 2, and signals taken from the lines $L_R'$, $L_G'$, $L_B'$ are the R, G and B image signals transmitted to the interconnecting terminal strips 30, 30' of FIG. 2.

Operation of the image selection circuit 20 of FIG. 5 is now described in detail. The following discussion deals with a case where the image select signal S1 is at a Low level, the image select signals S2 and S3 are at a High level, and the image priority signals P1 and P2 at a Low level, as shown in display mode ① of FIG. 8. When the image select signal S1 is at the Low level, an output of the AND gate AND1 (i.e., one of inputs to the OR gate OR1 of the image selection sub-circuit 21B) is kept continuously at a Low level. Similarly, when the image priority signal P1 is at the Low level, an output of the AND gate AND2 (i.e., one of inputs to the OR gate OR1 of the image selection sub-circuit 21A) is kept continuously at a Low level.

Figure 7:
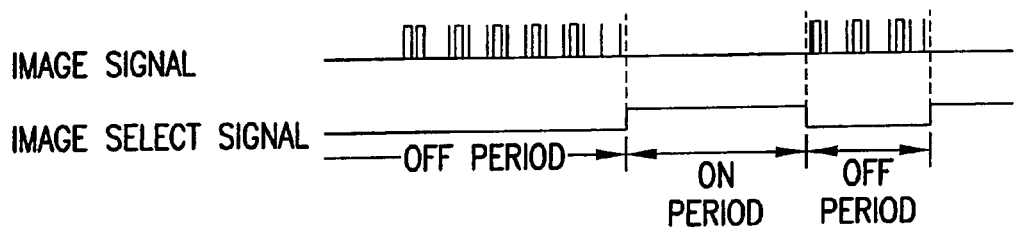
FIG. 7 is a diagram depicting image selecting operation performed by the circuit of FIG. 5.

When an image select signal is at the Low level, there occurs no change in the R, G and B image signals transmitted through the relevant signal lines $L_R$, $L_G$, $L_B$, but when the image select signal is switched to a High level, the corresponding transistors TR1–TR3 become ON so that the signal lines $L_R$, $L_G$, $L_B$ are grounded and levels of the R, G and B image signals carried by these signal lines are zeroed, as shown in FIG. 7. Therefore, in display mode ① of FIG. 8, the R, G and B image signals from only the device 1 (radar) are transmitted to the lines $L_R'$, $L_G'$, $L_B'$ and the indicators M, M' present only a radar picture.

In FIG. 8, only the image select signal S2 is at the Low level in display mode ② while only the image select signal S3 is at the Low level in display mode ③. Accordingly, the indicators M, M' present only an image fed from the device 2 (course plotter) in display mode ②, only an echogram fed from the device 3 (echo sounder) in display mode ③.

In display mode ④ of FIG. 8, the image select signal S3 is at the High level while the image select signals S1, S2 are at the Low level so that the R, G and B image signals from the device 3 (echo sounder) are suppressed while the R, G and B image signals from the radar 1 and the course plotter 2 are transmitted to the lines $L_R'$, $L_G'$, $L_B'$. If both of the image priority signals P1, P2 are set to the Low level, the image signals from the radar 1 and the course plotter 2 are superimposed with each other. If, however, the image priority signals P1, P2 are set to the High and Low levels, respectively, as shown in display mode ④ of FIG. 8, one input terminal of the AND gate AND1 becomes High. On the other hand, if any of the signal lines $L_R$, $L_G$, $L_B$ of the device 1 is at the High level, an output terminal of the OR gate OR2 (i.e., the other input terminal of the AND gate AND1) becomes High so that the image select signal S1 at the High level is supplied to one input terminal of the OR gate OR1 of the image selection sub-circuit 21B (with the image select signal S2 fed to the other input terminal set at the Low level) and the R, G and B image signals from the device 2 (course plotter) are suppressed. This means that the image signals from the device 2 (course plotter) are suppressed only when the image signals from the device 1 (radar) contain any picture information with first priority given to the radar picture.

If the image priority signal P1 is at the Low level and the image priority signal P2 is at the High level as shown in display mode ⑤ of FIG. 8, a course plot picture is presented with priority over the radar picture.

Figure 9:
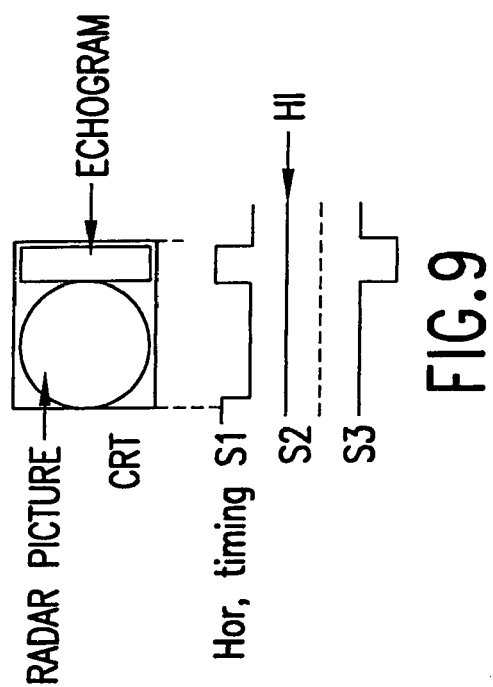
FIG. 9 is a diagram showing a relationship between image select signals and on-screen display controlled by the circuit of FIG. 5.

In display modes ① to ⑤ above, each image select signal is kept at the High or Low level throughout each successive horizontal scanning period. FIG. 9 shows a varied mode of presentation, in which a radar picture and an echogram are simultaneously displayed side by side. This is achieved by switching the image select signal S1 from the Low level to the High level and the image select signal S3 from the High level to the Low level at the same time during each successive horizontal scanning period as illustrated. An example of this kind of presentation is shown as display mode ⑥ in FIG. 8. If the levels of the image select signals S1 and S2 are switched in a similar way, a course plot picture and an echogram will be displayed side by side as shown in display mode ⑦ of FIG. 8.

In a case where the indicator M has a vertically elongate screen, it is possible to simultaneously present different images in upper and lower portions of the screen by switching the levels of the appropriate image select signals during each successive vertical scanning period.

If the course plot picture is superimposed on the radar picture of display mode ⑥ with priority given to the course plot picture, three images (radar, course plot and echogram) are displayed at the same time.

The display system so far described can present images fed from the individual measuring devices 1–3 in various display modes as shown in FIG. 8 on the indicators M, M' of FIG. 2 by transmitting the appropriate display control signals to the image selection circuit 20 through the common control line CTL. It is also possible to remotely set the measuring ranges and other operational parameters of the measuring devices 1–3 from the individual indicators M, M' by transmitting control signals associated with addresses designating the desired destination devices, i.e., the radar 1, the course plotter 2 and the echo sounder 3, as appropriate. While the indicators M, M' present the same picture in the above-described configuration of FIG. 2, it may be modified to permit presentation of different pictures on the individual indicators M, M'. This is accomplished by a display system according to a second embodiment of the invention, which is shown in FIG. 10.

Figure 10:
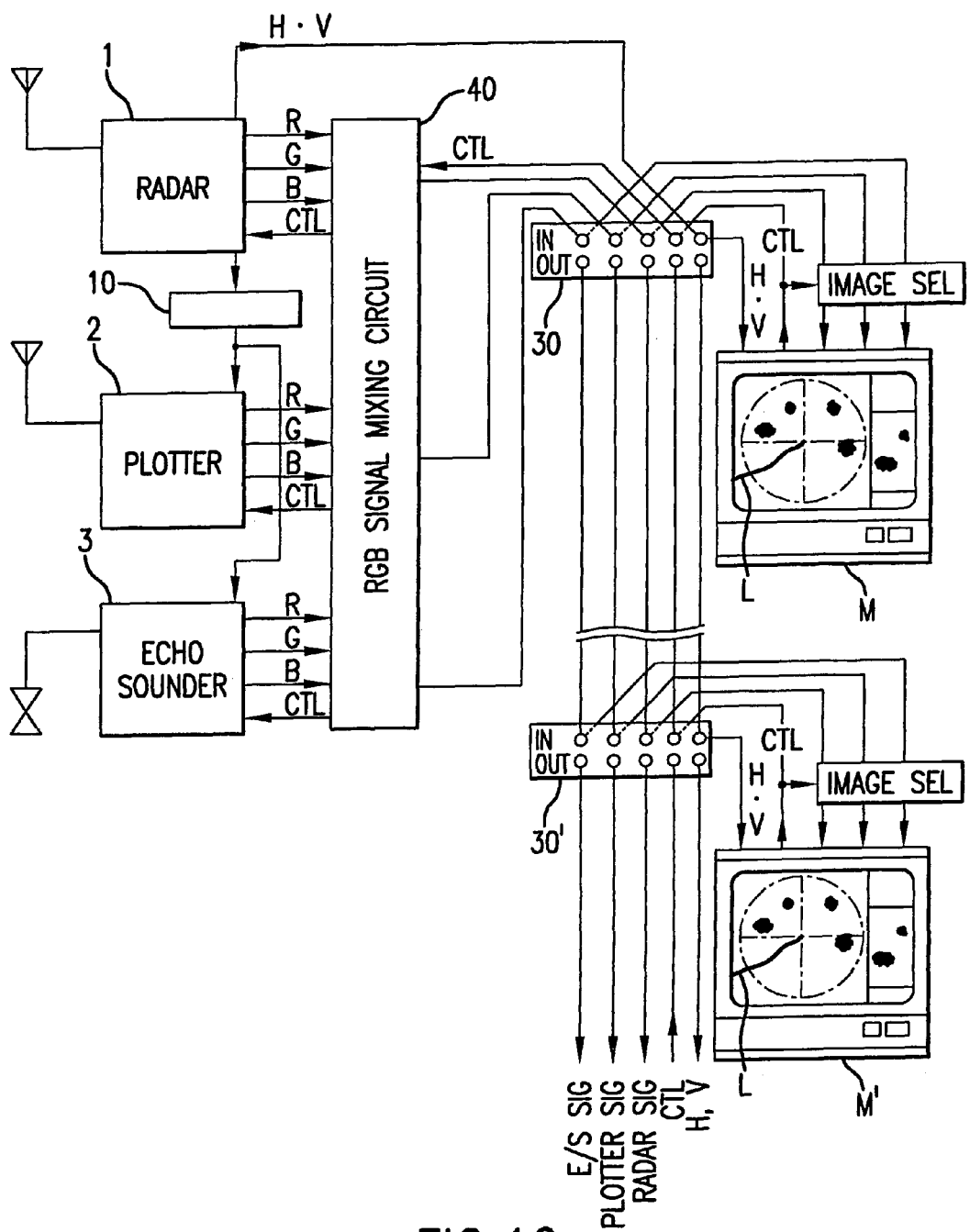
FIG. 10 is a general block diagram of a display system according to a second embodiment of the invention.

In the display system of FIG. 10, the indicators M, M' are provided with respective image selection blocks 50, which perform the same functions as the image selection circuit 20 of FIG. 2, to make it possible to present different pictures on the individual indicators M, M'. This display system requires somewhat complex wiring compared to the configuration of FIG. 2, because it would be necessary to connect three each signal lines (R, G and B) from the radar 1, the course plotter 2 and the echo sounder 3 to the individual image selection blocks 50 as in the configuration of FIG. 1. More specifically, at least nine coaxial cables would be required as the R, G and B signal lines.

To reduce this complexity in wiring, the display system of FIG. 10 has an RGB signal mixing circuit 40 for combining three each signal lines from the radar 1, the course plotter 2 and the echo sounder 3 into a single signal line (three signal lines in total for the measuring devices 1–3).

Figure 11:
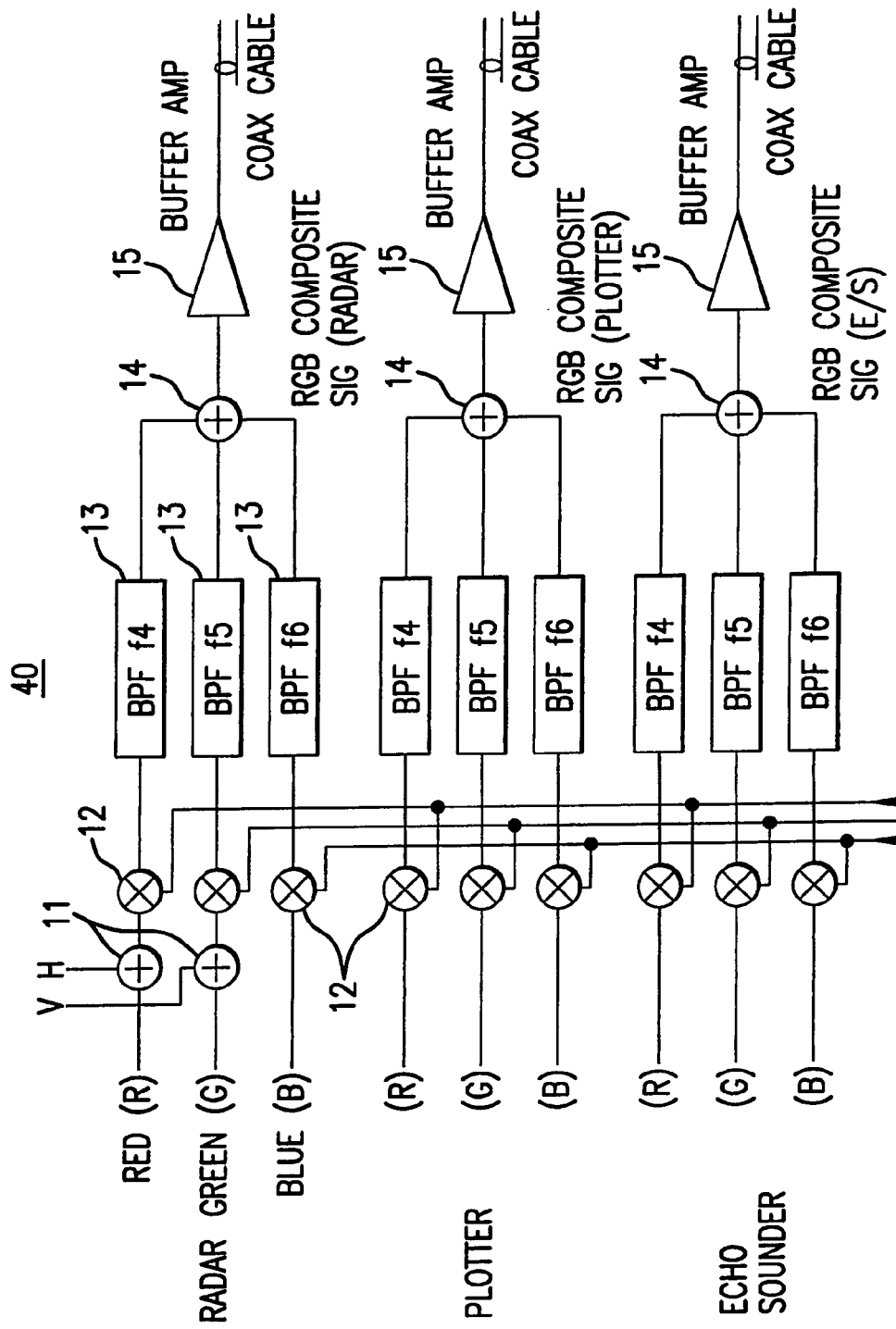
FIG. 11 is a block diagram showing the circuit configuration of an RGB signal mixing circuit of FIG. 10.
Figure 12:
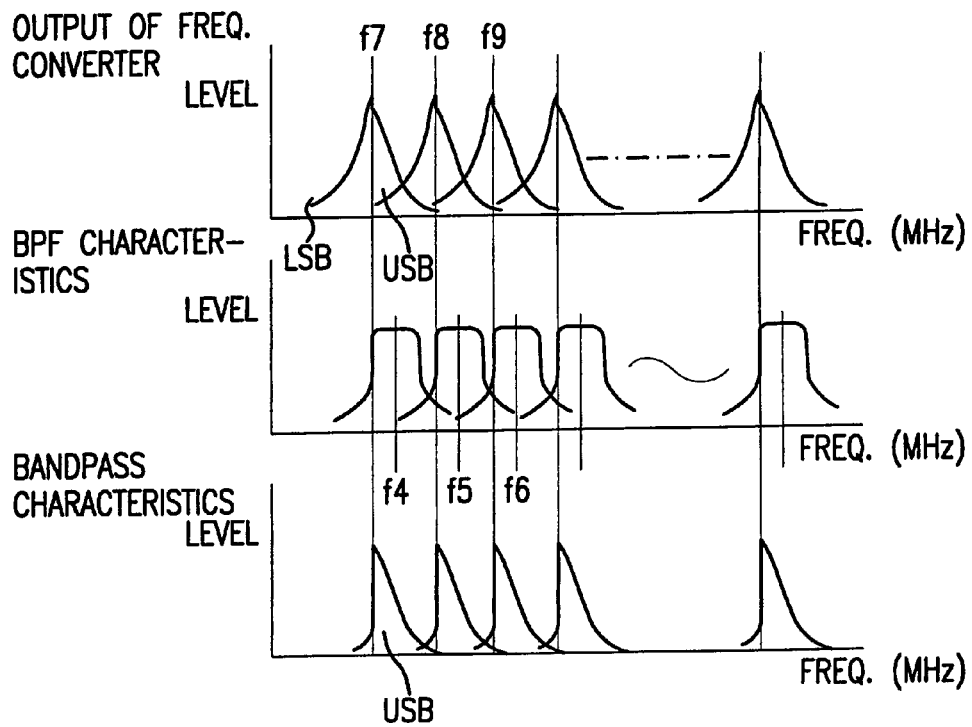
FIG. 12 is a diagram showing the operation of the RGB signal mixing circuit of FIG. 11.
Figure 13:
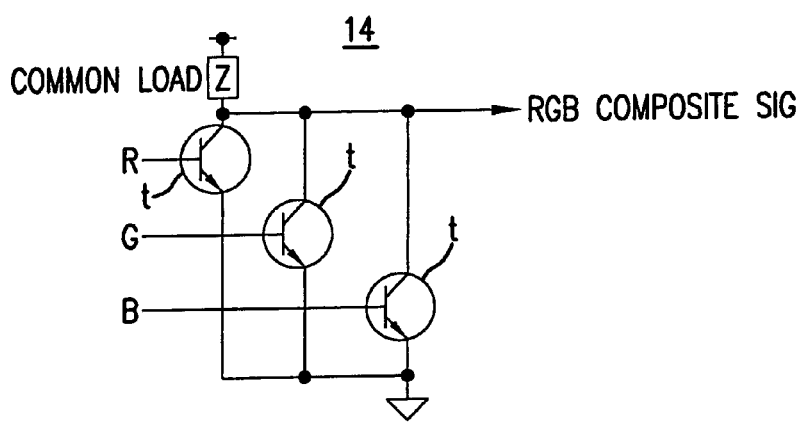
FIG. 13 is a circuit diagram showing the circuit configuration of one of adders of FIG. 11.

FIG. 11 shows the circuit configuration of the RGB signal mixing circuit 40, in which designated by the numeral 11 are signal adders for adding a horizontal synchronizing signal H and a vertical synchronizing signal V to R and B image signals fed from the radar 1, respectively. Designated by the numeral 12 are signal multipliers which perform frequency conversion by multiplying R, G and B image signals from the radar 1, the course plotter 2 and the echo sounder 3 by carriers of frequencies f7, f8 and f9, respectively. When the carrier of frequency f7 is modulated by a signal having a bandwidth of fs, upper sideband components falling within a frequency band of fc+fs and lower sideband components falling within a frequency band of fc–fs are obtained as shown in FIG. 12. Designated by the numeral 13 are bandpass filters which permit only the upper sideband components to pass through. As shown in FIG. 11, there are provided three bandpass filters 13 having center frequencies of f4, f5 and f6 for each of the measuring devices 1–3. Designated by the numeral 14 are adders for combining the upper sideband components which have passed through the bandpass filters 13 of R, G and B channels. FIG. 13 shows the circuit configuration of each adder 14, in which output signals of the bandpass filters 13 are added together by a combination of three transistors t. Referring again to FIG. 11, designated by the numeral 15 are buffer amplifiers which amplify combined, or composite, video signals of the radar 1, the course plotter 2 and the echo sounder 3 and deliver the amplified video signals through low-impedance output circuits. The composite video signals of the radar 1, the course plotter 2 and the echo sounder 3 thus obtained in the RGB signal mixing circuit 40 are transmitted to interconnecting terminal strips 30, 30'.

Figure 14:
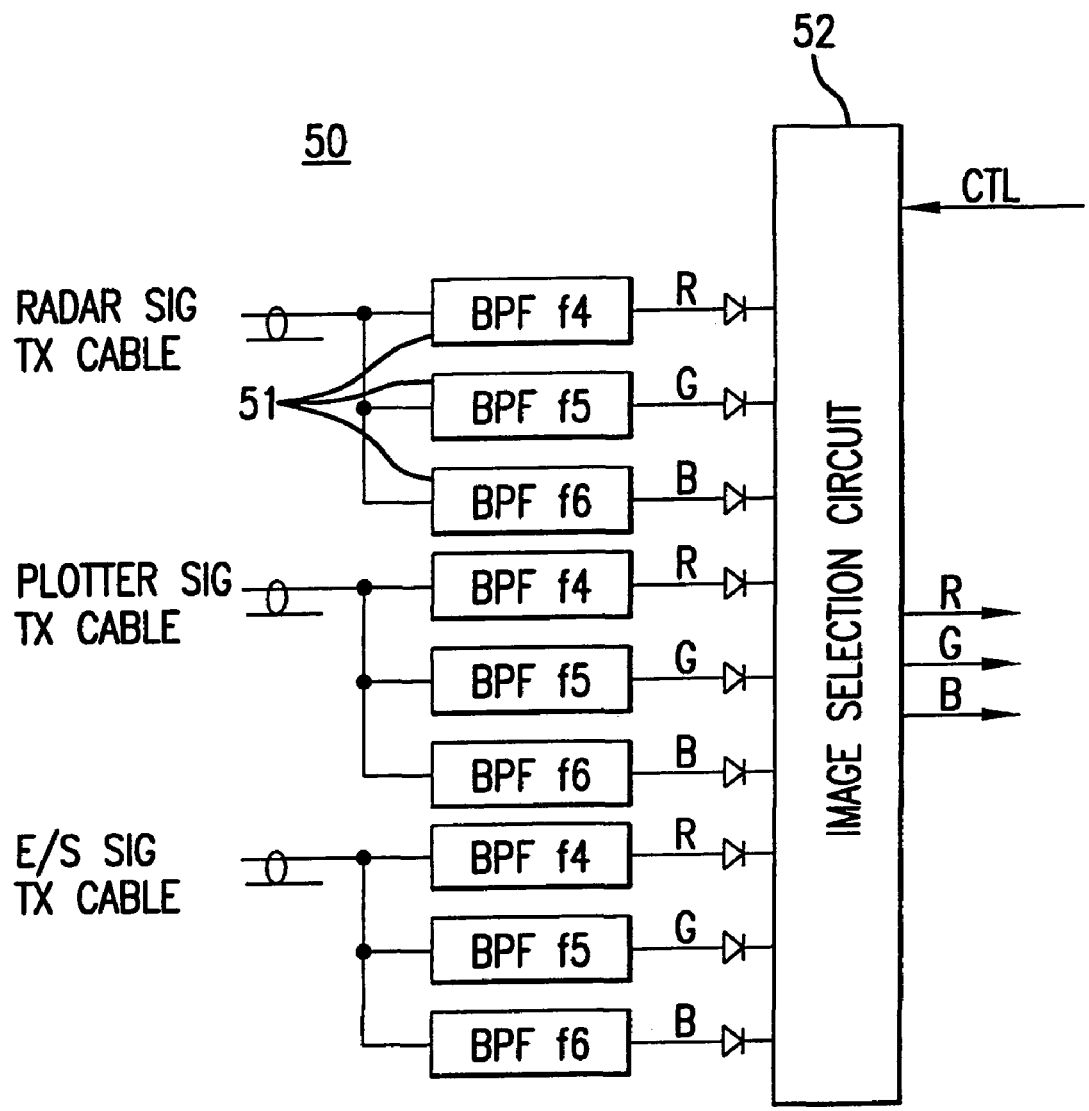
FIG. 14 is a block diagram showing the circuit configuration of each image selection block of FIG. 10.
Figure 15:
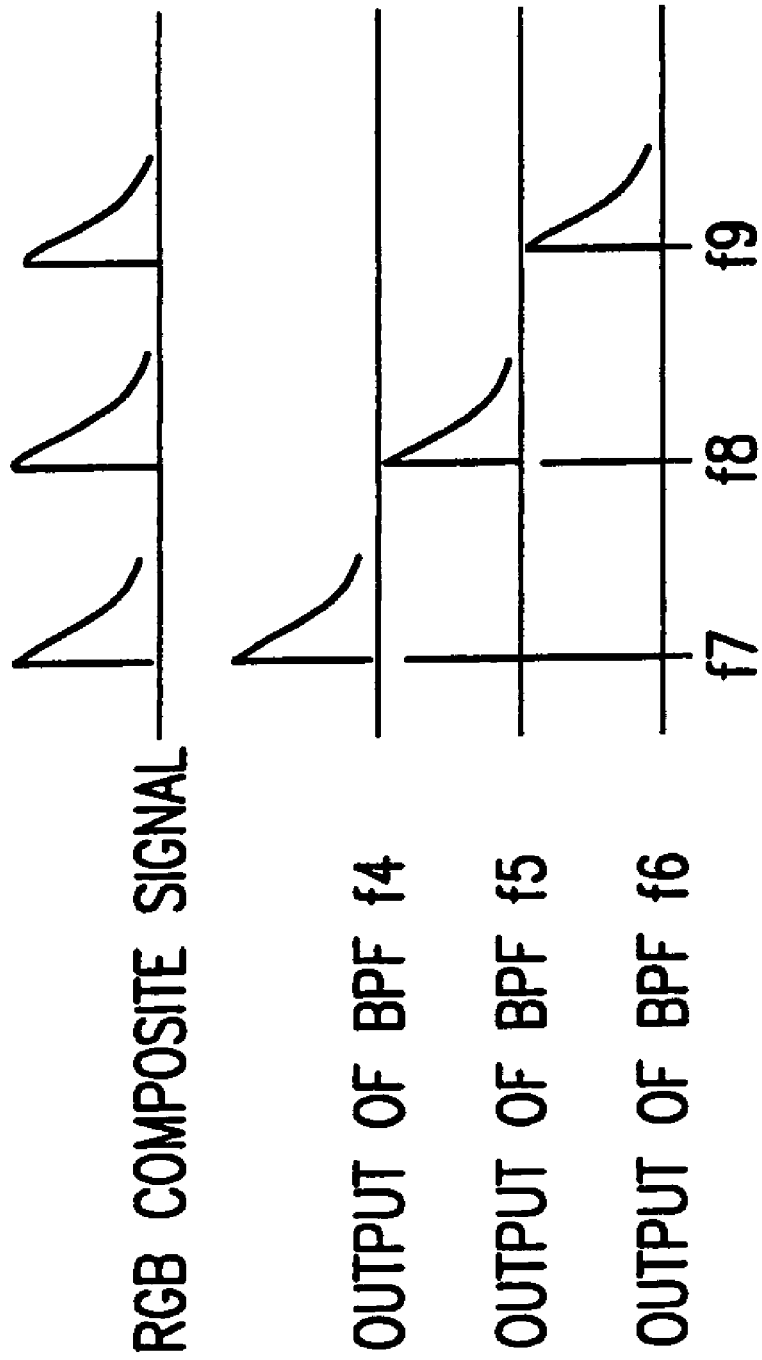
FIG. 15 is a diagram showing how an RGB composite signal is separated into R, G and B signal components by the image selection block of FIG. 14.

FIG. 14 shows the circuit configuration of each image selection block 50. The composite video signals of the radar 1, the course plotter 2 and the echo sounder 3 delivered through the interconnecting terminal strip 30 are fed into bandpass filters 51 having center frequencies of f4, f5 and f6 (which are equal to those shown in FIG. 11), respectively. As a consequence, the individual composite video signals are separated into R, G and B image signals as shown in FIG. 15 and these image signals are fed into an image selection circuit 52. The image selection circuit 52 performs the same function as the image selection circuit 20 of FIG. 2. It can present images fed from the individual measuring devices 1–3 in various display modes as shown in FIG. 8 on the relevant indicator M, M' by selecting and combining the desired image signals. In FIG. 10, the indicator M presents an echogram fed from the echo sounder 3 at the right of the screen and a radar picture at the left of the screen with a plotted course L of a ship overlaid on the radar picture. On the other hand, the indicator M' presents only a combination of the from an indicator.

Figure 16:
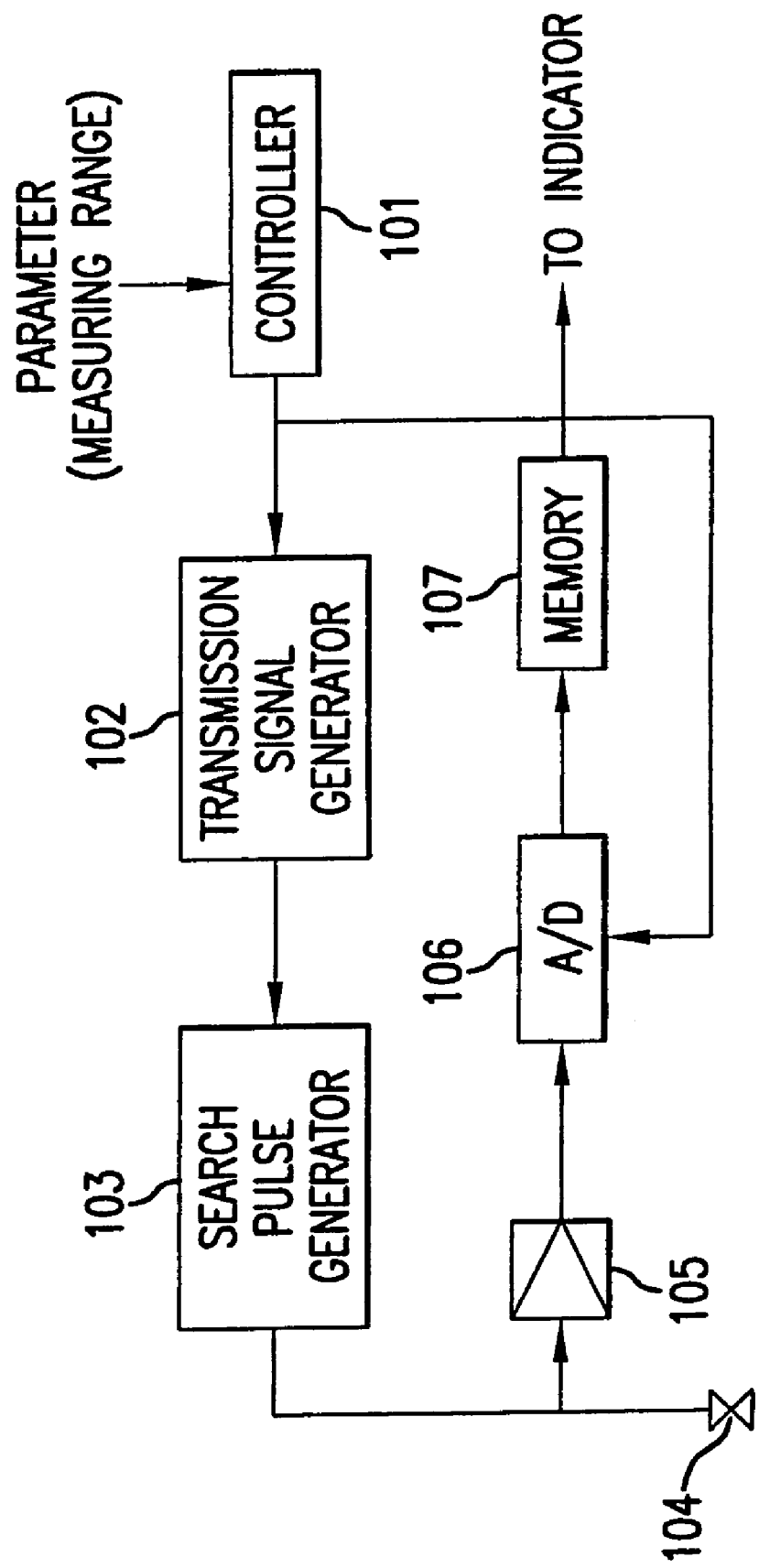
FIG. 16 is a block diagram of the echo sounder 3 in FIG. 2 or FIG. 10 for explaining how a control signal, i.e., a parameter, for example, for varying depth range is transmitted from one of the indicators to the echo sounder to be driven.
Figure 17:
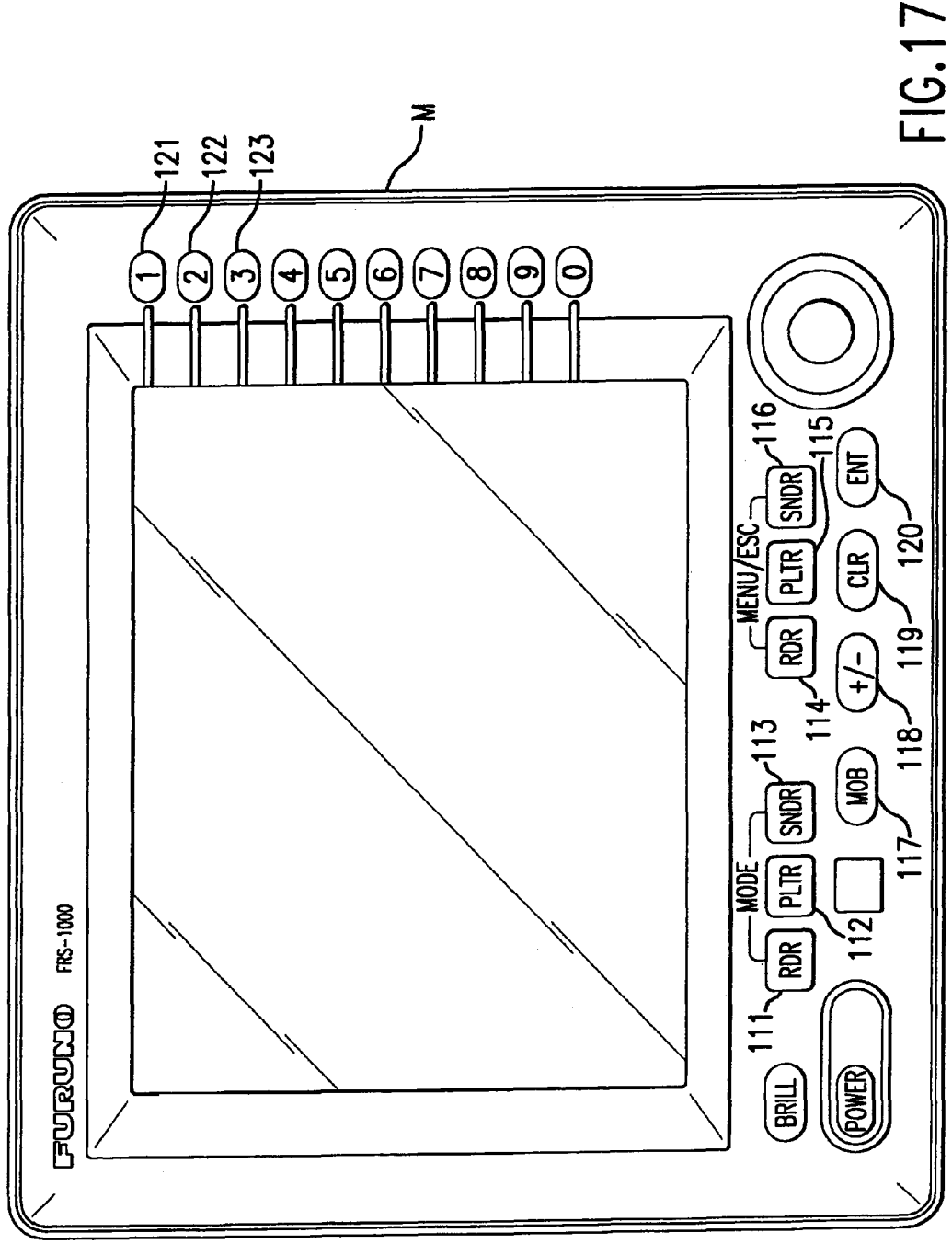
FIG. 17 is a front view of the indicator shown in FIG. 2 and FIG. 10.

Referring to FIGS. 16 and 17, there will be explained, particularly, how a control signal, i.e., a parameter, for example, for varying measurement range of the echo sounder 3 is transmitted from one of the indicators M, M' and how the echo sounder operates in response thereto.

The echo sounder 3 comprises a controller 101, a transmission signal generator 102, a search pulse generator 103, an ultrasound transducer 104, an amplifier 105, an analog-to-digital converter 106 and a memory unit 107.

On the panel of the indicator, there are arranged key switches 111, 112, 113, 114, 115, 116, 117, 118, 119, 120, 121, 122 and 123.

For instance, underwater conditions in a depth range of 0 to 100 meters are at an initial stage displayed on the indicator. When the depth range is desired to be changed to another search range 0 to 200 meters, the key 116 is first pressed down so that a signal having an ID-number "1 +116" is transmitted to a main processor (not shown) which transmits a control signal to the echo sounder 3 to place the echo sounder in an condition in which an operating parameter is changed. Then, the key 122 is pushed down so that a signal having an ID-number "1 +122" is transmitted to the main processor. When the key 116 is again pushed down, the main processor transmits a range control signal to the echo sounder 3. The controller 101 controls in response to the range control signal the transmission signal generator 102 and the A/D converter 106. The transmission signal generator 102 produces a pulse signal. The search pulse generator 103 generates a search signal having a carrier frequency modulated by the pulse. The search signal is transmitted into the water by means of the ultrasound transducer 104. Echo signals are received by the transducer 104 and are amplified by the A/D converter 106. Resultant digital signals are written into the memory unit 107. The signals stored in the memory are read out and transmitted to the indicator M so that underwater conditions in the depth range of 0 to 200 meters are displayed on the indicator M.

What is claimed is:

1. A display system which is provided on a ship, said system comprising:
   a plurality of measuring units, a least some of said units being arranged to signals different in kind from that produced by others of said units,
   a plurality of indicators located at different points on said ship with each of the indicators selecting and displaying signals from the plurality of measuring units;
   means for coupling between the plurality of measuring units and each of the plurality of indicators; and
   selectors provided in each of the indicators for selecting signals from the plurality of measuring units.

2. A display system according to claim 1, wherein a parameter is transmitted to a desired one of the plurality of measuring devices from at least one of the indicators.

3. A display system according to claim 2, wherein:
   said measuring devices comprise at least a radar and/or a plotter and/or an echo sounder installed in a ship, with the radar searching conditions around the ship, the plotter outputting signals representing a position of the ship and a past track thereof, and the echo sounder searching underwater conditions;
   said plurality of indicators select and display the signals supplied from radar and/or the plotter and/or the echo sounder;
   said coupling means couple between the radar and the plotter and the echo sounder and each of the plurality of indicators;
   said selectors are provided in each of the indicators for selecting the signals from the radar and/or the plotter and/or the echo sounder; and
   a parameter is transmitted to a desired one of the radar, the plotter and/or the echo sounder from at least one of the indicators.

4. The display system according to claim 1, wherein a parameter is transmitted to a desired one of the plurality of measuring units from at least one of the indicators.

5. The display system according to claim 1, wherein said selectors provided in each of the indicators control the means for coupling to select desired signals from amongst said signals produced by the plurality of measuring units for displaying on the respective one of the indicators in which the selector is provided.

6. A display system comprising;
a plurality of measuring devices installed in a ship;
a plurality of indicators installed at different points in the ship with each of the indicators selecting and displaying signals supplied from the plurality measuring devices;
means for coupling between the plurality of measuring devices and each of the plurality of indicators; and
selectors provided in each of the indicators for selecting signals from the plurality of measuring devices;
wherein a parameter is transmitted to a desired one of the plurality of measuring devices from at least one of the indicators.

7. The display system according to claim 6, wherein said selectors provided in each of the indicators control the means for coupling to select desired signals from amongst said signals produced by the plurality of measuring devices for displaying on the respective one of the indicators in which the selector is provided.

8. A display system comprising:
a plurality of measuring devices;
a plurality of indicators installed at different points with each of the indicators selecting and displaying signals from the plurality of measuring devices;
means for coupling between the plurality of measuring devices and each of the plurality of indicators; and
selectors provided in each of the indicators for selecting signals from the plurality of measuring devices;
wherein a parameter is transmitted to a desired one of the plurality of measuring devices from at least one of the indicators.

9. The display system according to claim 8, wherein said selectors provided in each of the indicators control the means for coupling to select desired signals from amongst said signals produced by the plurality of measuring devices for displaying on the respective one of the indicators in which the selector is provided.

10. A display system which is provided on a ship, said system comprising:
a plurality of informational signal producing units, at least some of said units being arranged to produce information which is different from that produced by others of said units,
a plurality of indicators located at different points on said ship with each of the indicators selecting and displaying signals from the plurality of informational signal producing units;
means for coupling between the plurality of informational signal producing units and each of the plurality of indicators;
selectors provided in each of the indicators for selecting signals from the plurality of informational signal producing units, wherein:
said signal producing units each produce signals;
said means for coupling provides said signals from each of said signal producing units simultaneously at said different points; and
said selectors in each of the indicators at said different points each respectively operate to select said signals of at least one of said signal producing units provided at a respective one of said different points for displaying on the respective indicator independently of signals selected at other ones of said indicators.

11. The display system of claim 10 wherein:
said means for coupling converts said signals from each of said signal producing units respectively to different frequency signals and transmits said different frequency signals on a common signal conducting medium; and
said selectors, in each of the indicators at said different points, each respectively operate to convert said different frequency signals to reproduce said signals selected of said at least one of said signal producing units.

12. A display system comprising:
a plurality of measuring devices installed in a ship;
a plurality of indicators installed at different points in the ship with each of the indicators selecting and displaying signals supplied from the plurality measuring devices;
means for coupling between the plurality of measuring devices and each of the plurality of indicators; and
selectors provided in each of the indicators for selecting signals from the plurality of measuring devices;
wherein a parameter is transmitted to a desired one of the plurality of measuring devices from at least one of the indicators, wherein:
said measuring devices each produce signals;
said means for coupling provides said signals from each of said measuring devices simultaneously at said different points; and
said selectors in each of the indicators at said different points each respectively operate to select said signals of at least one of said measuring devices provided at a respective one of said different points for displaying on the respective indicator independently of signals selected at other ones of said indicators.

13. The display system of claim 12 wherein:
said means for coupling converts said signals from each of said measuring devices respectively to different frequency signals and transmits said different frequency signals on a common signal conducting medium; and
said selectors, in each of the indicators at said different points, each respectively operate to convert said different frequency signals to reproduce said signals selected of said at least one of said measuring devices.

14. A display system comprising:
a plurality of measuring devices;
a plurality of indicators installed at different points with each of the indicators selection and displaying signals from the plurality of measuring devices;
means for coupling between the plurality of measuring devices and each of the plurality of indicators; and
selectors provided in each of the indicators for selecting signals from the plurality of measuring devices;
wherein:
a parameter is transmitted to a desired one of the plurality of measuring devices from at least one of the indicators,
said measuring devices each produce signals;
said means for coupling provides said signals from each of said measuring devices simultaneously at said different points; and said selectors in each of the indicators at said different points each respectively operate to select said signals of at least one of said measuring devices provided at a respective one of said different points for displaying on the respective indicator independently of signals selected at other ones of said indicators.

15. The display system of claim 14 wherein:
said means for coupling converts said signals from each of said measuring devices respectively to different frequency signals and transmits said different frequency signals on a common signal conducting medium; and said selectors, in each of the indicators at said different points, each respectively operate to convert said different frequency signals to reproduce said signals selected of said at least one of said measuring devices.

* * * * *